(12) United States Patent
Niemiec

(10) Patent No.: US 10,400,510 B2
(45) Date of Patent: Sep. 3, 2019

(54) AUTOMATED STEP DEVICE AND METHODS OF MAKING AND USING

(71) Applicant: Kenneth Robert Niemiec, Seabeck, WA (US)

(72) Inventor: Kenneth Robert Niemiec, Seabeck, WA (US)

(73) Assignees: Kenneth Robert Niemiec, Seabeck, WA (US); Tracy Knight, Seabeck, WA (US)

( * ) Notice: Subject to any disclaimer, the term of this patent is extended or adjusted under 35 U.S.C. 154(b) by 104 days.

(21) Appl. No.: 15/829,722

(22) Filed: Dec. 1, 2017

(65) Prior Publication Data

US 2019/0169930 A1 Jun. 6, 2019

(51) Int. Cl.
| | | |
|---|---|---|
| E06C 1/00 | (2006.01) | |
| G05B 15/02 | (2006.01) | |
| A47B 77/10 | (2006.01) | |
| A47C 12/00 | (2006.01) | |

(52) U.S. Cl.
CPC .............. *E06C 1/005* (2013.01); *G05B 15/02* (2013.01); *A47B 77/10* (2013.01); *A47B 2220/05* (2013.01); *A47C 12/00* (2013.01)

(58) Field of Classification Search
CPC ....... E04G 3/00; E06C 1/005; A47B 2220/05; A47B 77/10; A47C 12/00; A61G 7/053
See application file for complete search history.

(56) References Cited

U.S. PATENT DOCUMENTS

| | | |
|---|---|---|
| 3,311,190 A | 3/1967 | Naumann |
| 3,447,635 A | 6/1969 | Carlbom |
| 3,481,429 A | 12/1969 | Gaede |
| 3,638,250 A * | 2/1972 | Johnson ............... A47C 20/022 5/651 |
| 4,545,628 A | 10/1985 | Richey |
| 5,005,667 A | 4/1991 | Anderson |
| 5,285,992 A * | 2/1994 | Brown .................. B66F 7/0608 108/147 |
| 5,461,736 A * | 10/1995 | Carpenter ................. B66B 9/04 182/141 |
| 6,247,771 B1 | 6/2001 | Miller |
| 6,364,441 B1 | 4/2002 | Arnold |
| 6,425,457 B1 * | 7/2002 | Lundry .................. A47B 67/04 182/35 |

(Continued)

FOREIGN PATENT DOCUMENTS

DE 202011051122 U1 * 11/2011 ............. A47C 12/00

*Primary Examiner* — Christopher R Harmon

(74) *Attorney, Agent, or Firm* — Lowe Graham Jones PLC; Bruce E. Black

(57) ABSTRACT

An automated step includes a carriage moveable between a retracted position and a deployed position; a jack disposed on the carriage; a platform disposed on the jack; rotatable legs coupled to the platform and rotatable between a stowed position and an extended position; and a controller coupled to the carriage, the jack, and the legs. The controller, when activated to deploy the automated step, directs the carriage to extend, directs the jack to raise the platform, and directs the legs to rotate to the extended position and, when activated to retract the automated step, directs the legs to rotate to the stowed position, directs the jack to lower the platform, and directs the carriage to retract. The jack and legs both support the platform when a user stands on the automated step.

20 Claims, 7 Drawing Sheets

(56) References Cited

U.S. PATENT DOCUMENTS

| | | |
|---|---|---|
| 6,802,576 B2 | 10/2004 | Shepherd |
| 7,017,708 B1 | 3/2006 | Lynn |
| 9,212,038 B1 * | 12/2015 | Presti .................... B66F 11/042 |
| 9,585,489 B1 * | 3/2017 | Al-Quraini ........... A47C 16/025 |
| 10,052,764 B2 * | 8/2018 | Chelian .................. B25J 9/1664 |
| 2002/0109446 A1 | 8/2002 | Arnold |
| 2006/0174412 A1 | 8/2006 | Hornig |
| 2008/0238278 A1 | 10/2008 | Jeong et al. |
| 2009/0243448 A1 | 10/2009 | Yu et al. |
| 2011/0198154 A1 * | 8/2011 | Worley .................. A47C 12/00 182/148 |
| 2011/0214942 A1 * | 9/2011 | Niemiec .................. E04G 3/00 182/19 |
| 2014/0111072 A1 * | 4/2014 | Camadella ........... A47B 95/002 312/235.1 |
| 2017/0107761 A1 * | 4/2017 | Rooney .................. E06C 1/005 |
| 2018/0070732 A1 * | 3/2018 | Pillay ...................... B66F 7/065 |
| 2018/0118538 A1 * | 5/2018 | Latvys ...................... B66F 7/28 |

* cited by examiner

AUTOMATED STEP DEVICE AND METHODS OF MAKING AND USING

FIELD

The present invention is directed to the area of automated steps for home and other uses. The present invention is also directed to an automated step device that is stored under a cabinet or other object and extends outward and upward when activated.

BACKGROUND

Step stools or small ladders are commonly used in kitchens, bathrooms, workrooms, and other areas of homes, stores, warehouses, and the like to allow a user to reach storage or other spaces. These stools and ladders take up storage or floor space and are generally manually moved or erected when needed.

BRIEF SUMMARY

One embodiment is an automated step that includes a carriage configured and arranged to move between a retracted position and a deployed position; a jack disposed on the carriage; a platform disposed on the jack, wherein the jack is configured and arranged to raise and lower the platform; rotatable legs coupled to the platform and configured and arranged to rotate between a stowed position and an extended position, wherein the jack and rotatable legs both support the platform and a user when the automated step is in a deployed position and the user steps onto the platform; and a controller coupled to the carriage, the jack, and the legs. The controller is configured and arranged to, when activated to deploy the automated step, direct the carriage to extend, direct the jack to raise the platform, and direct the legs to rotate to the extended position and, when activated to retract the automated step, direct the legs to rotate to the stowed position, direct the jack to lower the platform, and direct the carriage to retract.

In at least some embodiments, the platform includes a base and sidewalls extending below the base, wherein the legs are attached to the sidewalls. In at least some embodiments, in the extended position, the legs each make an interior angle in a range of 95 to 110 degrees with the sidewall to which the leg is attached. In at least some embodiments, the jack is a scissor jack.

In at least some embodiments, directing the jack to raise the platform and directing the legs to rotate to the extended position includes directing the jack to raise the platform to a leg deployment height, directing the legs to rotate to the extended position, and then directing the jack to lower the platform to a final height. In at least some embodiments, directing the legs to rotate to the stowed position and directing the jack to lower the platform includes directing the jack to raise the platform to a leg retraction height, directing the legs to rotate to the stowed position, and then directing the jack to lower the platform to a nested position.

In at least some embodiments, the automated step further includes a sensor coupled to the controller and the sensor is configured and arranged to detect obstruction of the extension of the carriage. In at least some embodiments, the automated step further includes a sensor coupled to the controller and the sensor is configured and arranged to detect the user attempting to stand on the platform prior to full deployment of the automated step. In at least some embodiments, the automated step further includes a sensor coupled to the controller and the sensor is configured and arranged to detect failure of the legs to rotate to the extended position.

In at least some embodiments, the automated step further includes a sensor coupled to the controller and the sensor is configured and arranged to detect failure of the jack to raise the platform to a final height or a leg deployment height. In at least some embodiments, the automated step further includes a sensor coupled to the controller and the sensor is configured and arranged to detect obstruction of the retraction of the carriage. In at least some embodiments, the automated step further includes a sensor coupled to the controller and the sensor is configured and arranged to detect obstruction to lowering of the platform by the jack.

Another embodiment is an automated step that includes a carriage; a carriage drive mechanism attached to the carriage to move the carriage between a retracted position and a deployed position; a jack disposed on the carriage; a jack motor coupled to the jack; a platform disposed on the jack, where the jack is configured and arranged to raise and lower the platform; rotatable legs coupled to the platform, where the jack and rotatable legs both support the platform and a user when the automated step is in a deployed position and the user steps onto the platform; at least one leg motor coupled to the legs to rotate the legs between a stowed position and an extended position; and a processor coupled to the carriage drive mechanism, the jack motor, and the leg motors. The processor is configured and arranged to, when activated to deploy the automated step, direct the carriage drive mechanism to extend the carriage, direct the jack motor to raise the platform, and direct the at least one leg motor to rotate the legs to the extended position and, when activated to retract the automated step, direct the at least one leg motor to rotate the legs to the stowed position, direct the jack motor to lower the platform, and direct the carriage drive mechanism to retract the carriage.

In at least some embodiments, directing the jack motor to raise the platform and directing the at least one leg motor to rotate the legs to the extended position includes directing the jack motor to raise the platform to a leg deployment height, directing the at least one leg motor to rotate the legs to the extended position, and then directing the jack motor to lower the platform to a final height or a leg deployment height. In at least some embodiments, directing the at least one leg motor to rotate the legs to the stowed position and directing the jack motor to lower the platform includes directing the jack motor to raise the platform to a leg retraction height, directing the at least one leg motor to rotate the legs to the stowed position, and then directing the jack motor to lower the platform to a nested position.

In at least some embodiments, the automated step further includes a sensor coupled to the controller and the sensor is configured and arranged to detect obstruction of the extension of the carriage, wherein the processor is configured and arranged to halt extension of the carriage when the sensor detects the obstruction. In at least some embodiments, the automated step further includes a sensor coupled to the controller and the sensor is configured and arranged to detect the user attempting to stand on the platform prior to full deployment of the automated step, wherein the processor is configured and arranged to halt deployment of the automated step when the sensor detects the user attempting to stand on the platform.

In at least some embodiments, the automated step further includes a sensor coupled to the controller and the sensor is configured and arranged to detect the user attempting to stand on the platform prior to full deployment of the automated step, wherein the processor is configured and arranged to produce a visual or audible warning when the sensor detects the user attempting to stand on the platform. In at least some embodiments, the automated step further includes a sensor coupled to the controller and the sensor is configured and arranged to detect failure of the jack to raise the platform to a final height or a leg deployment height, wherein the processor is configured and arranged to halt deployment of the automated step when the sensor detects the failure of the jack to raise the platform to the final height or the leg deployment height.

In at least some embodiments, the automated step further includes a sensor coupled to the controller and the sensor is configured and arranged to detect obstruction of the retraction of the carriage, wherein the processor is configured and arranged to halt retraction of the carriage when the sensor detects the obstruction.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of automated steps for home and other uses. The present invention is also directed to an automated step device that is stored under a cabinet or other object and extends outward and upward when activated.

In contrast to conventional step stools and ladders, an automated step, as described below, can reside beneath cabinets or other objects and can be activated, when needed. The automated step extends outward from its storage space and the platform extends upward to form a solid, reliable step that the user can stand upon to reach higher storage or other spaces. Importantly, the automated step preferably provides safety mechanisms that prevent collapse of the step when the user stands upon it. In addition, the automated step also preferably detects situations in which the step cannot be successfully and safely deployed.

Figure 1:
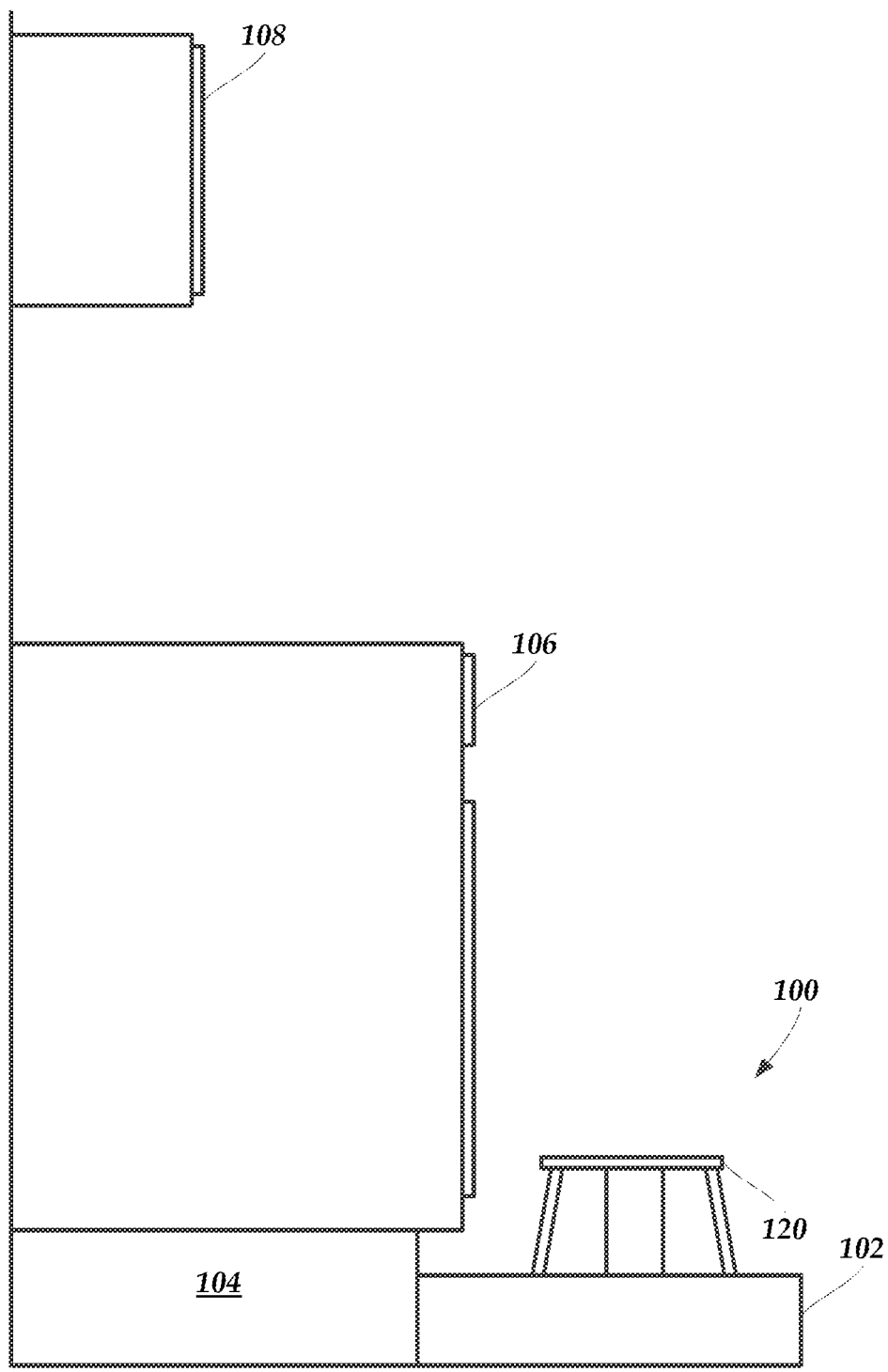
FIG. 1 is a schematic illustration of one embodiment of a deployed automated step in a kitchen environment, according to the invention.

FIG. 1 illustrates an example of a kitchen environment in which the automated step 100 can be useful. Although a kitchen environment is illustrated, it will be understood that the automated step can be used in many other environments including, but not limited to, bathrooms, closets, workrooms, stores, factories, storage spaces, medical facilities, and the like.

The automated step 100 includes a platform 120 that resides on a carriage 102 which can fit in a space 104 beneath a cabinet 106, appliance, or other object. As described in further detail below, the automated step 100 can be activated and the carriage 102 carries the automated step from beneath the cabinet 106 to a site in front of the cabinet and then the automated step 100 extends upward out of the carriage 102 and provides a platform that a user can then step onto to reach higher shelving or cabinets 108 or other spaces.

Figure 2A:
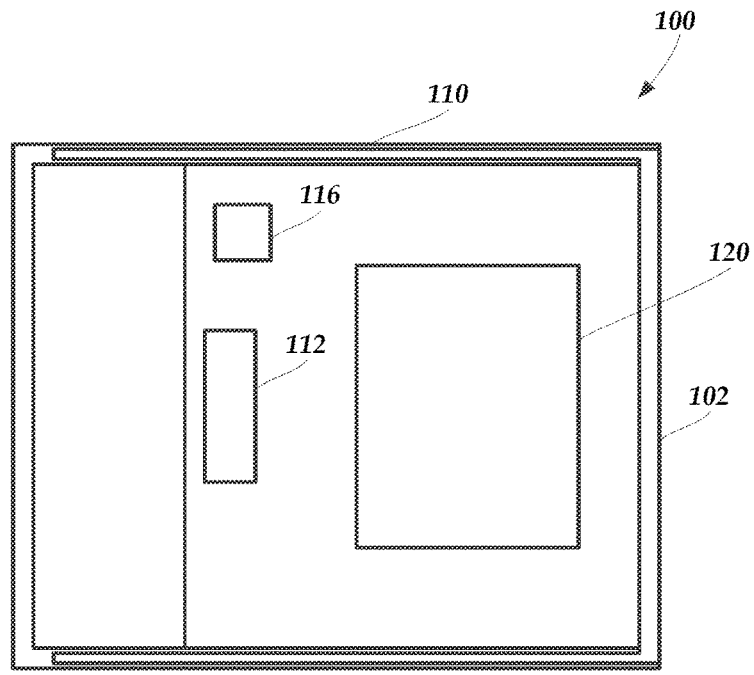
FIG. 2A is a schematic top view of one embodiment of an automated step in a retracted position, according to the invention.
Figure 2B:
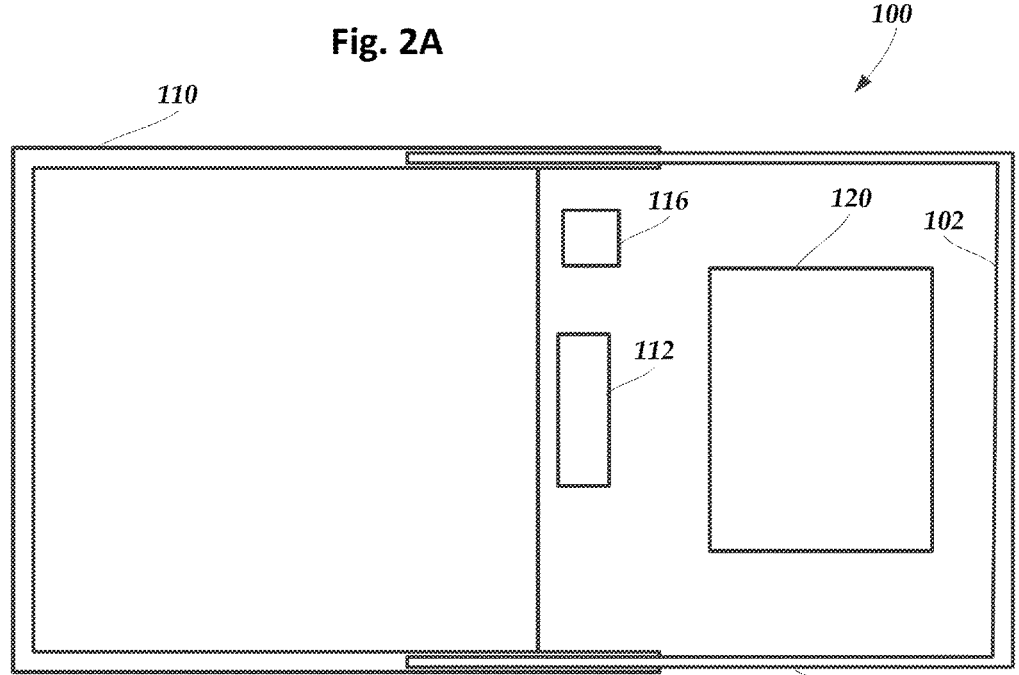
FIG. 2B is a schematic top view of the automated step of FIG. 2A in an extended or deployed position, according to the invention.

FIGS. 2A and 2B are top views of the carriage 102 and automated step 100 in a retracted position (FIG. 2A) and an extended or deployed position (FIG. 2B). A frame 110 or other housing can be provided around the carriage 102. A carriage drive mechanism 112 moves the carriage 102 from the retracted position to the extended position and back. Any suitable carriage drive mechanism 112 can be used. The carriage drive mechanism 112 can include, for example, a motor and drive wheel, drive chain, or drive train that moves the carriage 102 forward and backward. The carriage 102 may include, for example, expandable arms 114 that expand or contract similar to those used in many drawer arrangements. A controller 116 is provided to coordinate and operate the carriage drive mechanism 112 and other components of the automated step 100.

Figure 3A:
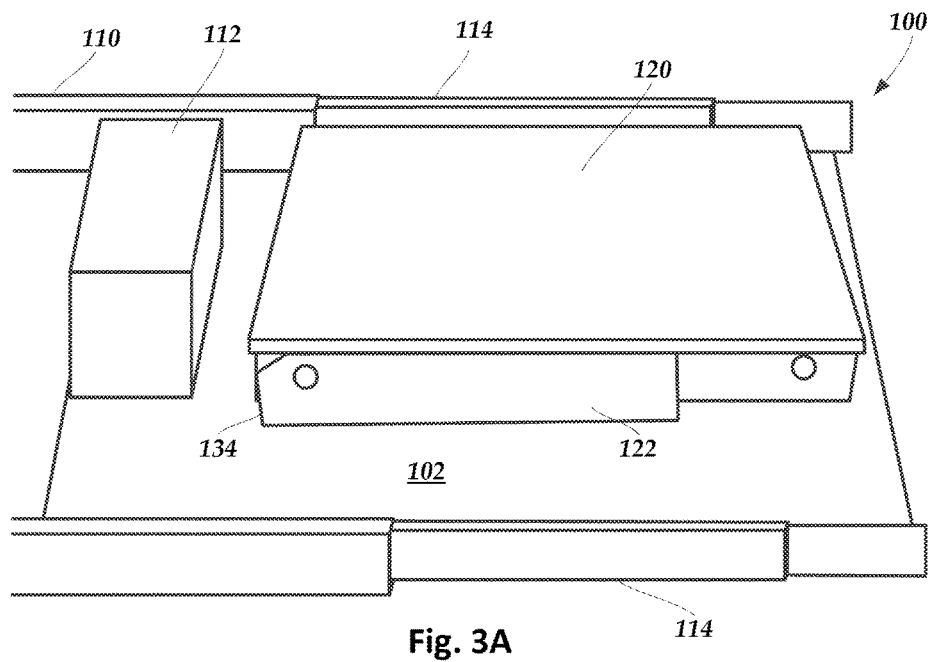
FIG. 3A is a schematic perspective view of the automated step of FIG. 2B in a nested position, according to the invention.
Figure 3B:
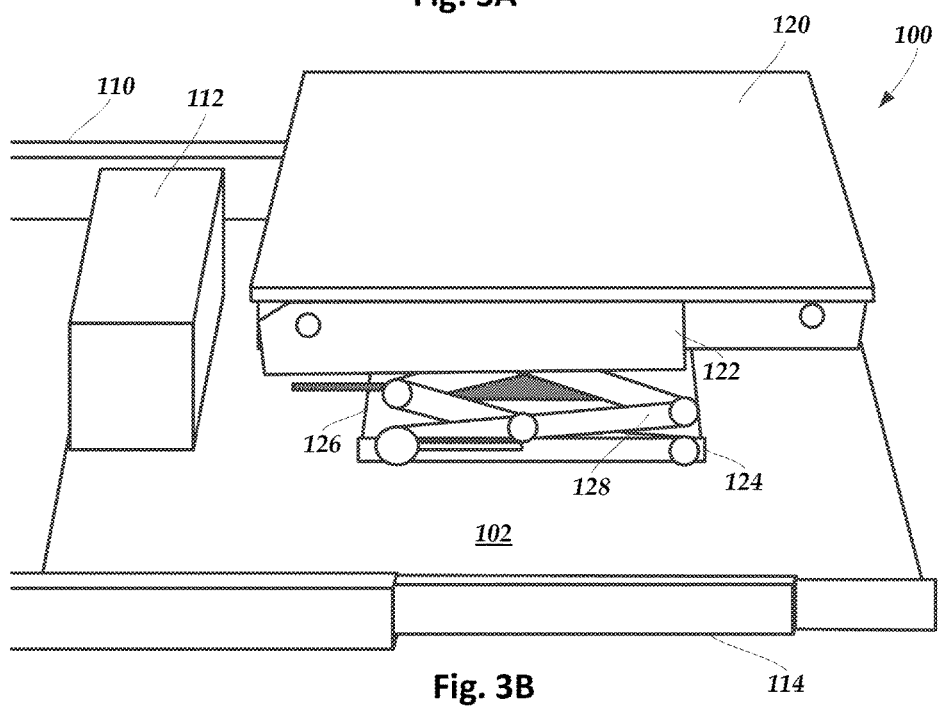
FIG. 3B is a schematic perspective view of the automated step of FIG. 2B as the jack begins to raise the platform, according to the invention.
Figure 3C:
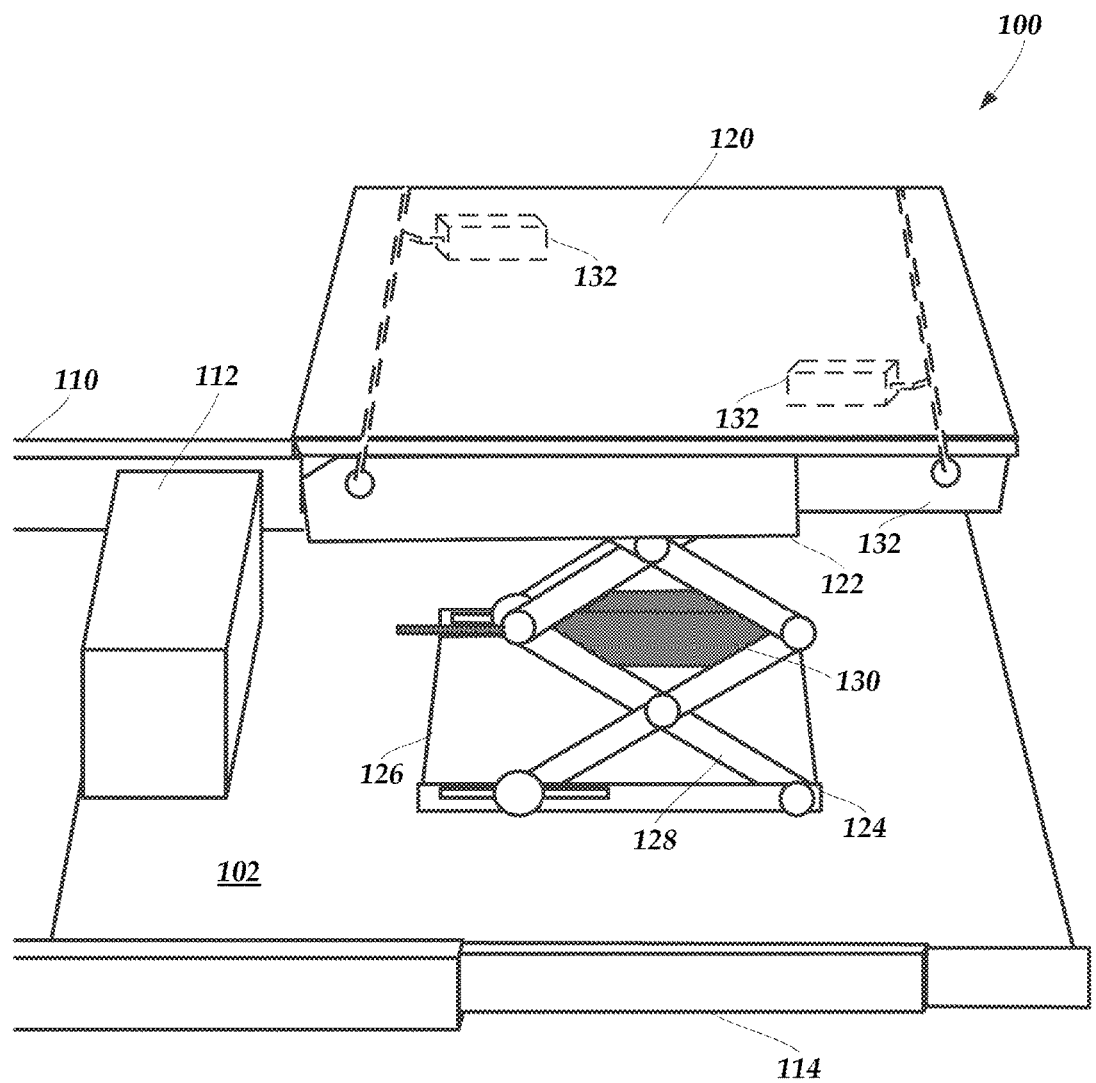
FIG. 3C is a schematic perspective view of the automated step of FIG. 2B as the jack raises the platform to a leg deployment height, according to the invention.
Figure 3D:
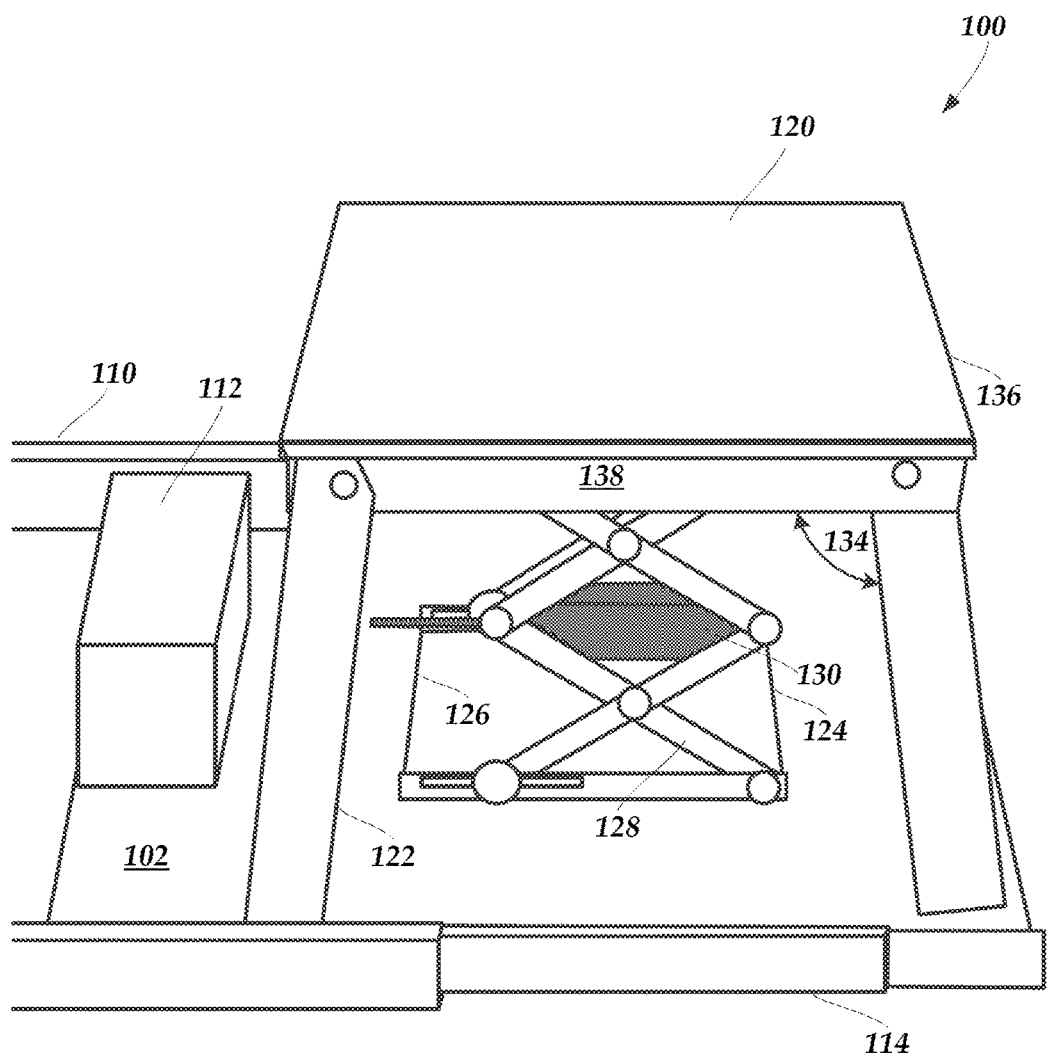
FIG. 3D is a schematic perspective view of the automated step of FIG. 2B with the legs deployed and the platform at the final height, according to the invention.

FIGS. 3A to 3D illustrate different stages in the upward extension (or downward retraction) of the platform 120 of the automated step 100. Not all of the components of the automated step 100 are illustrated in FIGS. 3A to 3D for clarity. Attached to the platform 120 are legs 122 that are retracted along the sides of the platform in a stowed position when the automated step 100 is in the nested position, as illustrated in FIG. 3A, prior to extension. The platform 120 is attached to a jack 124 (FIGS. 3B to 3D) that raises the platform 120 from the nested position to the extended position (FIG. 3D). The illustrated jack 124 (FIGS. 3B to 3D) includes a base 126, one or more extendable arms 128, and a jack motor 130 (FIGS. 3C and 3D) to raise or lower the jack 124. In the illustrated embodiment, the jack motor is center mounted, but other arrangements of the jack motor can be used including, but not limited to, a side mounted belt-driven motor. In the illustrated embodiment, the jack 124 is a scissor jack with extendable arms 128 that are made of multiple metal strips that are joined near the ends, and in the middle, of each strip. In the illustrated embodiment, the jack 124 is double layered. Other suitable types of jacks can be used including, but not limited to, a rotatable ring screw jack or a pneumatic telescoping hydraulic jack.

FIGS. 3A to 3C illustrate the lifting of the platform 120 by the jack 124 to a leg deployment height that is higher than the final extended height of the platform 120. The legs 122 are then deployed to an extended position, as illustrated in FIG. 3D, and the jack is retracted so that the legs make firm contact with the bottom of the carriage 102 or the floor to form a solid and stable step for the user to stand upon. Leg deployment motors 132 (FIG. 3C) can be used to rotate the legs from their retracted position (FIGS. 3A to 3C) against the platform to the deployed position (FIG. 3D).

The legs 122 support the platform 120 and the user standing on the platform. In at least some embodiments, the jack 124 may also support the platform 120 and the user standing on the platform. This provides two independent support elements for the user so that if one fails, the other maintains the platform 120 upright. Provision of two independent platform supports enhances the safety of the automated step 100 and prevents or reduces accidents and product failure. Moreover, the legs 122 are preferably formed from a single piece of material and preferably do not change shape (e.g., preferably do not contain any joints, hinges, or slidable regions along the length of the legs) during, before, or after deployment in order to reduce or prevent leg collapse. In at least some embodiments, the legs 122 each form an obtuse angle 134 (for example, an angle in a range of 95 to 110 degrees) with an adjacent portion of the platform 120 so that the legs 122 are splayed slightly outwardly relative to the platform.

In at least some embodiments, the platform 120 includes a base 136 and sidewalls 138 extending below the base. In at least some embodiments, the base 136 extends laterally beyond the sidewalls 138, as illustrated in FIGS. 3A-3D, and, when the legs 122 are deployed, a top side 134 (FIG. 3A) of each leg 122 is disposed against or near a bottom side of the base 136. The flange-like arrangement of the base 136 and slight outward splaying of the legs further prevents or resists leg collapse because the base 136 acts as a stop if the leg should rotate in a direction that increases angle 132.

Figure 4:
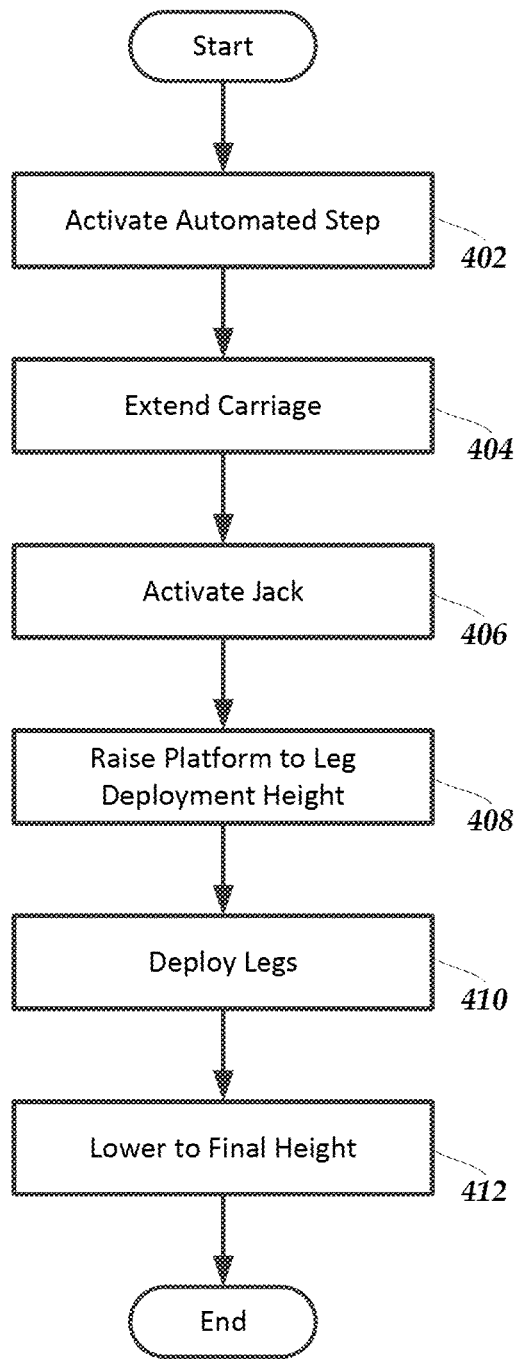
FIG. 4 is a flowchart of one embodiment of a method of deploying an automated step, according to the invention.

FIG. 4 illustrates one example of a method of deploying the automated step 100. In step 402, the automated step 100 is activated. Any suitable method for activation or type of activator 160 (FIG. 6) can be used. For example, in some embodiments, a user may tap a front plate of the carriage 102 (or perform some other activating motion or activity) to activate the automated step 100. The automated step 100 can include a sensor 164 (FIG. 6) that can be activated by one or more of pressure, infrared, voice, motion, or an accelerometer, or any other suitable type of sensor or combination of sensors, coupled to the controller 116 (FIG. 2A). The sensor 164 detects the activating motion or activity and the detection is registered by the controller 116 which activates the automated step 100. In some embodiments, the user may have a remote control 162, cell phone, tablet, computer, mounted button, or switch or any other suitable device that is coupled by wire or wirelessly to the controller 116 to activate the automated step 100. An automated step 100 may be designed to utilize one or more of these activation methods or any other suitable activation method.

In step 404, the carriage 102 is extended from beneath the object (such as the cabinet 106) under which the automated step 100 is stored, as illustrated in FIG. 2B. In some embodiments, the automated step 100 can include a pressure, infrared, or other sensor 164 (FIG. 6) that can detect when an obstruction will prevent or otherwise hinder full extension of the carriage. In some embodiments, the controller 116 may undertake one or more of the following activities when an obstruction is detected: 1) retract the carriage and halt the deployment procedure; 2) produce a warning (for example, a visual or audible warning or any combination thereof), 3) retry extension of the carriage, or 4) any combination or sequence of these activities.

In step 406, after the carriage 102 is extended, the controller 116 activates the jack 124. In step 408, the jack 124 raises the platform 120 to a leg deployment height, as illustrated in FIGS. 3B and 3C. In some embodiments, the automated step 100 can include a pressure or other sensor 164 (FIG. 6) that can detect if pressure is applied to the platform 120 before the platform 120 is in the proper position or if the jack fails to achieve the leg deployment height. This can indicate that the user is attempting to step on the platform 120 before the platform and legs 122 are fully deployed or that there is an obstruction preventing the jack from achieving the leg deployment height. In some embodiments, the controller 116 may undertake one or more of the following activities when the pressure is detected: 1) cause the jack to lower and halt the deployment procedure; 2) produce a warning (for example, a visual or audible warning or any combination thereof), 3) halt operation of the jack, or 4) any combination or sequence of these activities. The sensor 164 (FIG. 6) and controller 116 may also continue detection and remedial action during steps 410 and 412.

In step 410, with the platform 120 at the leg deployment height, the controller 116 causes the legs 122 to be deployed by rotating the legs 122 from the stowed position to the extended position. The leg deployment height is selected so that the legs 122 can be rotated without hitting the carriage or floor. In some embodiments, the automated step 100 can include a pressure or other sensor 164 (FIG. 6) that can detect if the legs 122 do not rotate to the proper position. In some embodiments, the controller 116 may undertake one or more of the following activities when a problem with leg deployment is detected: 1) retry deployment of the legs; 2) halt the leg deployment procedure; 3) produce a warning (for example, a visual or audible warning or any combination thereof), or 4) any combination or sequence of these activities.

In step 412, with the legs 122 deployed, the jack 124 lowers the platform 120 to the final height with the legs 122 firmly settled against the carriage 102 or floor, as illustrated in FIG. 3D. In some embodiments, the automated step 100 can include a pressure or other sensor 164 (FIG. 6) that can detect if the legs 122 do not firmly settle against the carriage or the floor. In some embodiments, the controller 116 may undertake one or more of the following activities when a problem with leg deployment is detected: 1) retry deployment of the legs; 2) halt the leg deployment procedure; 3) produce a warning (for example, a visual or audible warning or any combination thereof), or 4) any combination or sequence of these activities.

Figure 5:
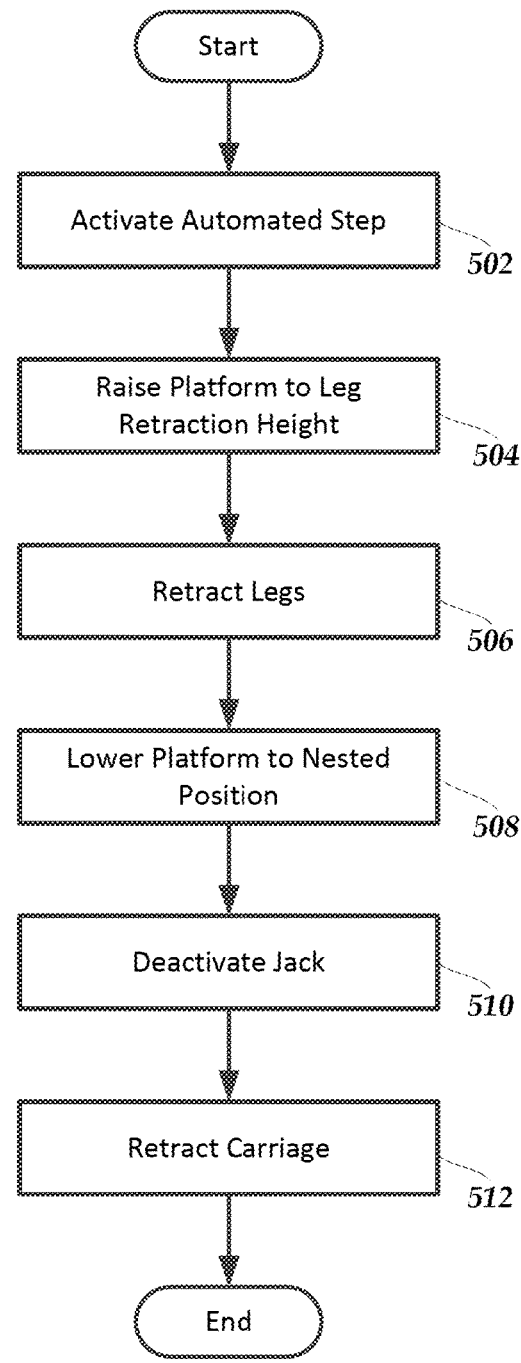
FIG. 5 is a flowchart of one embodiment of a method of retracting an automated step, according to the invention.

FIG. 5 illustrates one example of a method of retracting and stowing the automated step 100 after deployment. In step 502, the automated step 100 is activated. Any suitable method for activation or type of activator 160 (FIG. 6) can be used. For example, in some embodiments, a user may tap a front plate of the carriage 102 (or perform some other activating motion or activity) to activate the automated step 100. The automated step 100 can include a sensor 164 (FIG. 6) that can be activated by one or more of pressure, infrared, voice, motion, or an accelerometer, or any other suitable type of sensor or combination of sensors, coupled to the controller 116 (FIG. 2A). The sensor 164 detects the activating motion or activity and the detection is registered by the controller 116 which performs step 502. In some embodiments, the user may have a remote control 162, cell phone, tablet, computer, mounted button, or switch or any other suitable device that is coupled by wire or wirelessly to the controller 116 to activate the automated step 100. An automated step 100 may be designed to utilize one or more of these activation methods or any other suitable activation method.

In step 504, after the automated step 100 is activated, the controller 116 activates the jack 124 to raise the platform to a leg retraction height. The leg retraction height may be the same or different from the leg deployment height. In some embodiments, the automated step 100 can include a pressure or other sensor 164 (FIG. 6) that can detect if pressure is applied to the platform 120 which may be indicative of the user standing on the platform. In some embodiments, the controller 116 may undertake one or more of the following activities when the pressure is detected: 1) halt operation of the jack; 2) produce a warning (for example, a visual or audible warning or any combination thereof), 3) halt activation of the automated step, or 4) any combination or sequence of these activities. The sensor 164 (FIG. 6) and controller 116 may also continue detection and remedial action during steps 504 to 512.

In step 506, with the platform 120 at the leg retraction height, the controller 116 causes the legs 122 to be retracted by rotating the legs 122 from the extended position (FIG. 3D) to the stowed position (FIG. 3C). The leg retraction height is selected so that the legs 122 can be rotated without hitting the carriage or floor. In some embodiments, the automated step 100 can include a pressure or other sensor 164 (FIG. 6) that can detect if the legs 122 do not rotate to the proper position. In some embodiments, the controller 116 may undertake one or more of the following activities when a problem with leg deployment is detected: 1) retry retraction of the legs; 2) halt the leg retraction procedure; 3) produce a warning (for example, a visual or audible warning or any combination thereof), or 4) any combination or sequence of these activities.

In step 508, the jack 124 lowers the platform 120 to a nested position, as illustrated in FIG. 3A. Once lowered to the nested position, the jack is deactivated in step 510. In some embodiments, the automated step 100 can include a pressure or other sensor 164 (FIG. 6) that can detect if the platform 120 does not fully retract to the nested position. This can indicate that there is an obstruction preventing or hindering retraction of the platform 120. In some embodiments, the controller 116 may undertake one or more of the following activities when the pressure is detected: 1) retry lowering the platform; 2) produce a warning (for example, a visual or audible warning or any combination thereof), 3) halt operation of the jack, or 4) any combination or sequence of these activities.

In step 512, the carriage 102 is retracted beneath the object (such as the cabinet 106) under which the automated step 100 is stored, as illustrated in FIG. 2A. In some embodiments, the automated step 100 can include a pressure, infrared, or other sensor 164 (FIG. 6) that can detect when an obstruction will prevent or otherwise hinder full retraction of the carriage. In some embodiments, the controller 116 may undertake one or more of the following activities when an obstruction is detected: 1) retry to retract the carriage; 2) produce a warning (for example, a visual or audible warning or any combination thereof), 3) halt retraction of the carriage, or 4) any combination or sequence of these activities.

Figure 6:
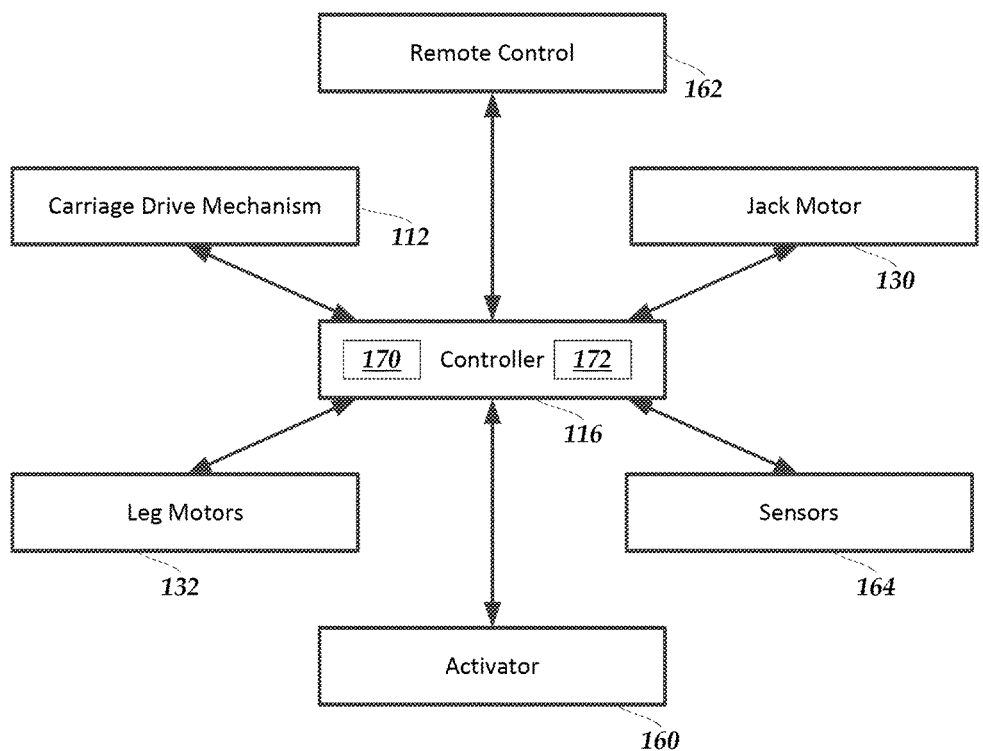
FIG. 6 is a schematic illustration of elements, including a controller, of one embodiment of an automated step, according to the invention.

FIG. 6 illustrates one embodiment of elements of the automated step 100 that are controlled by, or are in wireless or wired communication with, the controller 116. Such elements can include, for example, a carriage drive mechanism 112, jack motor 130, leg motors 132, remote control 162, activator 160, and one or more sensors 164. It will be recognized that some embodiments of the automated step 100 may not include all of these elements or that some of these elements may be combined together. It will also be recognized that the controller may also control or be in communication with other devices. It will also be recognized that an automated step 100 may have more than one controller with the multiple controllers preferably operating together.

The controller 116 can include, for example, at least one processor 170 and at least one memory 172. Any suitable processor and any suitable memory can be used. The memory illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EPROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

The methods and the controller 116 described herein may be embodied in many different forms and should not be construed as limited to the embodiments set forth herein. Accordingly, the methods and controller 116 described herein may take the form of an entirely hardware embodiment, an entirely software embodiment or an embodiment combining software and hardware aspects. Methods of communication between the controller 116 and other elements of the automated step 100 can include both wired and wireless (e.g., RF, optical, or infrared) communications methods and such methods provide another type of computer readable media; namely communication media. Wired communication can include communication over a twisted pair, coaxial cable, fiber optics, wave guides, or the like, or any combination thereof. Wireless communication can include RF, infrared, acoustic, near field communication, Bluetooth™, or the like, or any combination thereof.

It will be understood that each block of the flowchart illustrations, and combinations of blocks in the flowchart illustrations and methods disclosed herein, can be implemented by computer program instructions. These program instructions may be provided to a processor to produce a machine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computer system. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

The above specification provides a description of the invention and the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. An automated step, comprising:
   a carriage configured and arranged to move between a retracted position and a deployed position;
   a jack disposed on the carriage;
   a platform disposed on the jack, wherein the jack is configured and arranged to raise and lower the platform;
   a plurality of rotatable legs coupled to the platform and configured and arranged to rotate between a stowed position and an extended position, wherein the jack and rotatable legs both support the platform and a user when the automated step is in a deployed position and the user steps onto the platform; and
   a controller coupled to the carriage, the jack, and the legs, wherein the controller is configured and arranged to:
      when activated to deploy the automated step, direct the carriage to extend, direct the jack to raise the platform, and direct the legs to rotate to the extended position, and
      when activated to retract the automated step, direct the legs to rotate to the stowed position, direct the jack to lower the platform, and direct the carriage to retract.

2. The automated step of claim 1, wherein the platform comprises a base and sidewalls extending below the base, wherein the legs are attached to the sidewalls.

3. The automated step of claim 2, wherein, in the extended position, the legs each make an interior angle in a range of 95 to 110 degrees with the sidewall to which the leg is attached.

4. The automated step of claim 1, wherein directing the jack to raise the platform and directing the legs to rotate to the extended position comprises directing the jack to raise the platform to a leg deployment height, directing the legs to rotate to the extended position, and then directing the jack to lower the platform to a final height.

5. The automated step of claim 1, wherein directing the legs to rotate to the stowed position and directing the jack to lower the platform comprises directing the jack to raise the platform to a leg retraction height, directing the legs to rotate to the stowed position, and then directing the jack to lower the platform to a nested position.

6. The automated step of claim 1, further comprising a sensor coupled to the controller, wherein the sensor is configured and arranged to detect obstruction of the extension of the carriage.

7. The automated step of claim 1, further comprising a sensor coupled to the controller, wherein the sensor is configured and arranged to detect the user attempting to stand on the platform prior to full deployment of the automated step.

8. The automated step of claim 1, further comprising a sensor coupled to the controller, wherein the sensor is configured and arranged to detect failure of the legs to rotate to the extended position.

9. The automated step of claim 1, further comprising a sensor coupled to the controller, wherein the sensor is configured and arranged to detect failure of the jack to raise the platform to a final height or a leg deployment height.

10. The automated step of claim 1, further comprising a sensor coupled to the controller, wherein the sensor is configured and arranged to detect obstruction of the retraction of the carriage.

11. The automated step of claim 1, further comprising a sensor coupled to the controller, wherein the sensor is configured and arranged to detect obstruction to lowering of the platform by the jack.

12. The automated step of claim 1, wherein the jack is a scissor jack.

13. An automated step, comprising:
    a carriage;
    a carriage drive mechanism attached to the carriage and configured and arranged to move the carriage between a retracted position and a deployed position;
    a jack disposed on the carriage;
    a jack motor coupled to the jack;
    a platform disposed on the jack, wherein the jack is configured and arranged to raise and lower the platform;
    a plurality of rotatable legs coupled to the platform, wherein the jack and rotatable legs both support the platform and a user when the automated step is in a deployed position and the user steps onto the platform;
    at least one leg motor coupled to the legs and configured and arranged to rotate the legs between a stowed position and an extended position; and
    a processor coupled to the carriage drive mechanism, the jack motor, and the at least one leg motor, wherein the processor is configured and arranged to:
       when activated to deploy the automated step:
          direct the carriage drive mechanism to extend the carriage,
          direct the jack motor to raise the platform, and
          direct the at least one leg motor to rotate the legs to the extended position and when activated to retract the automated step;
          direct the at least one leg motor to rotate the legs to the stowed position,
          direct the jack motor to lower the platform, and
          direct the carriage drive mechanism to retract the carriage.

14. The automated step of claim 13, wherein directing the jack motor to raise the platform and directing the at least one leg motor to rotate the legs to the extended position comprises directing the jack motor to raise the platform to a leg deployment height, directing the at least one leg motor to rotate the legs to the extended position, and then directing the jack motor to lower the platform to a final height.

15. The automated step of claim 13, wherein directing the at least one leg motor to rotate the legs to the stowed position and directing the jack motor to lower the platform comprises directing the jack motor to raise the platform to a leg retraction height, directing the at least one leg motor to rotate the legs to the stowed position, and then directing the jack motor to lower the platform to a nested position.

16. The automated step of claim 13, further comprising a sensor coupled to the controller, wherein the sensor is configured and arranged to detect obstruction of the extension of the carriage, wherein the processor is configured and arranged to halt extension of the carriage when the sensor detects the obstruction.

17. The automated step of claim 13, further comprising a sensor coupled to the controller, wherein the sensor is configured and arranged to detect the user attempting to stand on the platform prior to full deployment of the automated step, wherein the processor is configured and arranged to halt deployment of the automated step when the sensor detects the user attempting to stand on the platform.

18. The automated step of claim 13, further comprising a sensor coupled to the controller, wherein the sensor is configured and arranged to detect the user attempting to stand on the platform prior to full deployment of the automated step, wherein the processor is configured and arranged to produce a visual or audible warning when the sensor detects the user attempting to stand on the platform.

19. The automated step of claim 13, further comprising a sensor coupled to the controller, wherein the sensor is configured and arranged to detect failure of the jack to raise the platform to a final height or a leg deployment height, wherein the processor is configured and arranged to halt deployment of the automated step when the sensor detects the failure of the jack to raise the platform to the final height or the leg deployment height.

20. The automated step of claim 13, further comprising a sensor coupled to the controller, wherein the sensor is configured and arranged to detect obstruction of the retraction of the carriage, wherein the processor is configured and arranged to halt retraction of the carriage when the sensor detects the obstruction.

* * * * *